UNITED STATES PATENT OFFICE.

HUGO GALLINOWSKY, OF CINCINNATI, OHIO, ASSIGNOR TO LAURENCE ELKUS, OF INDIANAPOLIS, INDIANA.

PROCESS OF ENAMELING BRICKS, TILES, AND BUILDING-BLOCKS.

No. 859,875.   Specification of Letters Patent.   Patented July 9, 1907

Application filed June 1, 1907. Serial No. 376,849.

*To all whom it may concern:*

Be it known that I, HUGO GALLINOWSKY, a citizen of the United States, residing in Cincinnati, in the county of Hamilton and State of Ohio, have invented a new and useful Improvement in the Process of Enameling Bricks, Tiles, and Building-Blocks, of which the following is a specification.

This invention relates to the process of enameling bricks, building blocks and tiles by means of a mixture of any suitable cement and a vegetable fiber such as sawdust; and has for its object the preservation and beautifying of the bricks.

Previously whatever attempts have been made in enameling bricks have been effected by burning on the enamel. The process hereinafter avoids that step.

My method is as follows: As there is always free or uncarbonated lime on the face of sand-lime, composite or cement bricks, tiles and building-blocks, which interferes with the proper action of the magnesia cement which I employ for my enamel composition, I first apply a diluted solution of hydrochloric acid, with a brush or other suitable utensil to the face of the brick which is to be enameled. I then prepare the enameling composition which consists of a mixture of a magnesia cement or any other suitable cement with a vegetable fiber such as sawdust. This mixture I apply on a piece of glass of about the size of the face of the brick, tile or building-block. I then spread some of the aforesaid mixture on the face of the brick to be enameled. Thereafter I place the glass with its covered side on the previously treated face of the brick and allow the mixture to harden for twelve hours. With the removal of the glass at the end of that time the operation is completed.

I claim as new:

1. The process of enameling brick or other refractory material, first, by applying cement mixed with sawdust to the face of the refractory material; secondly, covering the glass of suitable size with the same mixture, applying the covered side of said glass to the treated face of the said refractory material, removing the aforesaid glass, after a suitable period, substantially as described.

2. The process of enameling refractory material, first, by washing the face of the refractory material to be enameled with a mild solution of the hydrochloric acid; secondly, treating said face of said refractory material with a mixture of cement and vegetable fiber; thirdly, applying the said mixture of cement and vegetable fiber to a sheet of glass of suitable size; fourthly, applying the said covered side of said glass to the treated face of said refractory material, and finally removing said glass, substantially as described.

In witness whereof, I have hereunto set my hand and seal, the 28th day of May, 1907.

HUGO GALLINOWSKY. [L. S.]

In the presence of
CHAS. W. FOSTER.
COURT B. WHITSON.